Jan. 6, 1948. J. G. INGRES 2,433,953
PRESSURE BOOSTER FOR HYDRAULIC BRAKE SYSTEMS
Filed April 12, 1943
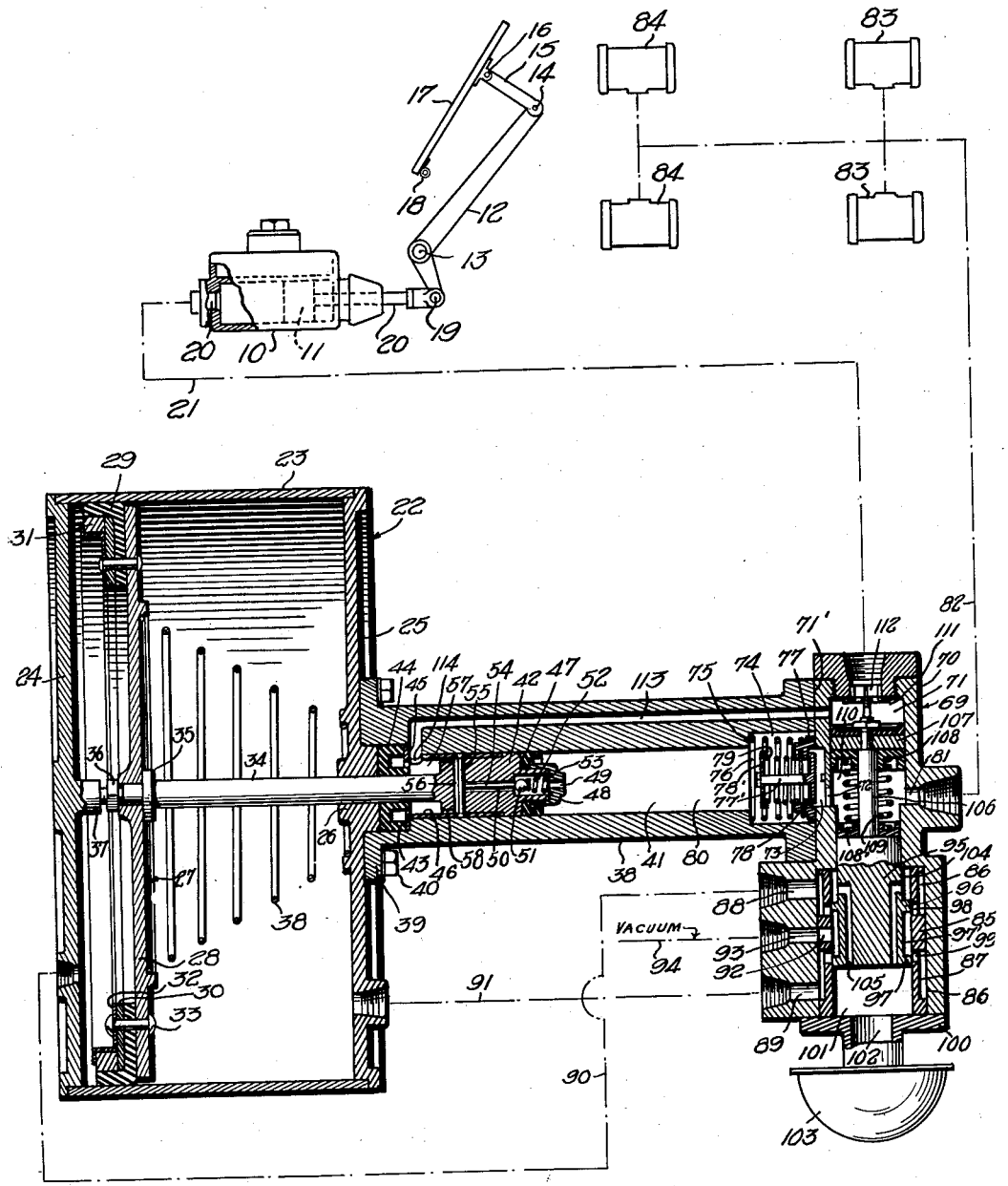
Inventor
J. G. INGRES
By C. L. Parker
Attorney Patented Jan. 6, 1948

2,433,953

UNITED STATES PATENT OFFICE 2,433,953

PRESSURE BOOSTER FOR HYDRAULIC BRAKE SYSTEMS

Jeannot G. Ingres, Detroit, Mich., assignor to Automatic Shifters, Inc., Richmond, Va., a corporation of Virginia Application April 12, 1943, Serial No. 482,776

6 Claims. (Cl. 60—54.5)

This invention relates to hydraulic brake mechanisms, particularly for motor vehicles.

A number of power operated hydraulic brake mechanisms have been developed wherein the power source is in the form of a fluid pressure operated motor having a control valve of the follow-up type subject to actuation by fluid displaced from the master brake cylinder. Such a mechanism is highly advantageous in that it employs no mechanical motion transmitting means between the brake pedal operated parts of the mechanism and the power unit. A single hydraulic fluid line extends from the master cylinder to the control valve mechanism and this arrangement permits the mounting of the power unit wherever desired. This is highly important in that it usually is difficult to find the space necessary for locating the power unit in such position with respect to the pedal operated unit as to permit mechanical connection of these units.

While mechanisms of the character referred to are highly efficient in operation, they are usually open to some objections. For example, most devices of this character employ a valve mechanism located within and operable in association with the plunger or piston rod of the fluid pressure operated motor. Such an arrangement is relatively expensive and is additionally disadvantageous because of the inaccessibility of the valve mechanism.

An important object of the present invention is to provide a hydraulic brake mechanism of the general character referred to, and more specifically a brake mechanism having a valve mechanism arranged externally of the power unit, and to form the valve mechanism substantially as a unit with the power unit by being directly mounted against a portion thereof.

A further object is to provide such a brake mechanism wherein a valve-controlling pressure chamber is arranged in the fluid conduit between the pressure chamber of the power unit and the wheel cylinders of the vehicle, thus providing a simple and efficient means for effecting a follow-up action of the valve mechanism.

A further object is to provide a novel mechanism of the character referred to which substantially reduces the normal amount of work necessary for the operation of the brake pedal, thus permitting the use of a brake operating treadle having a short range of travel as is rendered possible in a power-operated mechanism.

More specifically a further object is to provide a brake mechanism of the character just referred to wherein the automatic valve mechanism for normally maintaining pressure in the brake lines to the wheel cylinders is adapted to be opened under the influence of pressure generated by the motor rather than by the foot of the operator, thus requiring the operator to perform less work and rendering it practicable to operate the brakes through a treadle having a short range of movement whereby it may be arranged adjacent and approximately at the same normal height as the vehicle accelerator pedal when the latter is in normal position.

Other objects and advantages of the invention will become apparent during the course of the following description.

In the drawing,

The figure is a structural-diagrammatic view in which the power unit is shown in central longitudinal section, the pedal and master cylinder are shown on a relatively small scale in side elevation with a portion broken away, and the wheel cylinders and piping connections are diagrammatically represented.

Referring to the drawing the numeral 10 designates a master cylinder for a hydraulic brake mechanism, and this master cylinder is conventional except as referred to below. The master cylinder is filled with brake fluid displaceable upon operation of a piston 11 operable by a bell crank lever 12 pivotally supported as at 13. The upper arm of the bell crank lever is pivoted as at 14 to a link 15, and this link is pivoted as at 16 to a treadle 17. The treadle 17 is pivoted as at 18 with respect to the toe board of the vehicle and preferably occupies a normal position approximately in the plane of the normal position of the vehicle accelerator pedal (not shown) and adjacent such pedal so that the right foot of the operator can be quickly shifted from the accelerator pedal to the treadle 17 without the operator's having to substantially lift his foot, as is true with conventional arrangements. The lower arm of the bell crank lever is connected as at 19 to the rod 20 of the piston 11, sufficient play being provided at this connection to permit linear movement of the rod 20 while the lower arm of the bell crank lever swings about the axis of the pivot 13. A pin and slot arrangement may be employed for this purpose as will be obvious.

In conventional foot-operated hydraulic brake systems the master cylinder is directly connected to the wheel cylinders of the vehicle. In such systems it is the common practice to employ at the outlet end of the master cylinder an automatic valve arrangement including spring pressed inlet and outlet valves controlling communication between the master cylinder and the lines leading to the brake cylinders. Such a valve arrangement normally maintains some 17 pounds pressure in the brake lines, which pressure is not sufficient to overcome the return springs of the brake cylinders, thus normally permitting the brakes to be released. Any expansion of the fluid in the brake lines due to temperature increases is accommodated by the opening of the spring pressed inlet valve referred to, thus preventing the building up of pressure in the brake lines such as would overcome the brake return springs.

Such an arrangement is advisable, and is wholly practicable when a conventional foot operated brake pedal is employed, because of leverage through which the operator depresses the brake pedal. It requires little force by the operator to open the outlet valve of the master cylinder against the normal pressure in the brake lines. Where power means is employed for creating all or part of the fluid pressure for effecting the braking action, it is not necessary to provide substantial leverage in the brake pedal, which leverage requires a relatively great range of pedal travel. In itself, the use of a power mechanism permits the use of a treadle, such as the treadle 17, since the operator is called upon to perform only a small part of the force required for a braking operation. However, the maintenance of the usual normal pressure in the brake lines renders it impracticable to employ a low-positioned brake operating treadle since the reduction in the leverage as compared with a conventional brake pedal will, in itself, require the operator to use substantial force merely to open the outlet valve of the master cylinder against the normal pressure of the brake lines. As will be described below, the present invention eliminates the necessity for using substantial force and thus permits the use of the treadle 17 referred to, the power unit of the present apparatus being utilized to perform most of the work required for building up the brake line pressure above its normal pressure when the brakes are to be applied. It will be noted, therefore, that the conventional spring arrangement at the outlet end of the master cylinder is eliminated, this cylinder directly communicating through an open port 20 with a fluid line 21 which functions in a manner to be described.

The power unit of the present apparatus is a unitary construction as shown. The fluid pressure operated motor of such unit is indicated as a whole by the numeral 22 and comprises a cylinder 23 having heads 24 and 25 the latter of which is provided with an axial bearing 26. A piston 27, reciprocable in the cylinder 23, comprises a plate 28 carrying an annular or similar cup 29 held in position against the plate 28 by a plate 30. An expanding ring 31 engages the cylindrical portion of the cup 29 and is held in position by a retainer 32. Rivets 33 or other similar fastening elements pass through plate 28, cup 29, plate 30 and retainer 32 to connect these elements together as a unit.

A piston rod 34 has an annular shoulder 35 seating against the plate 28 and extends axially through the plate 28. The projecting end of the piston rod is threaded to be received in a nut 36 by means of which the plate 28 is fixed to the piston rod. The head 24 is provided with an axial stud 37 engageable with the adjacent end of the piston rod 34 to limit movement of the piston to its normal or "off" position shown in the drawing. A spring 38 may be employed for assisting movement of the piston to its "off" position, although it will become apparent that the motor preferably has its piston power-operated in both directions.

A cylinder 38 is arranged in axial alignment with the motor 22 and is flanged as at 39 to be bolted as at 40 to the cylinder head 25. The cylinder 38 has a bore 41 in which is arranged a plunger 42 carried by the piston rod 34. This piston rod operates in a packing cup 43 arranged in the adjacent end of the bore 41, such end of the bore being somewhat enlarged as indicated by the numeral 44. A ring 45 is arranged against the shoulder at the inner end of the bore 44. A sleeve 46 surrounds one end portion of the plunger 42 and the ring or plate 45 acts as a stop for the sleeve 46 as the plunger approaches its "off" position for a purpose to be described.

The end of the bore 41 to the right of the plunger 42, as viewed in the drawing, constitutes a pressure chamber and the plunger 42 carries a packing cup 47 to prevent leakage of fluid from this chamber past the plunger. This packing cup is held in position by a nut 48 having an axial opening 49 therethrough. The plunger 42 is provided with a bore 50 normally closed by a ball 51 arranged in a bore 52 communicating with the axial opening 49. A spring 53 normally seats the ball 51, as will be obvious. A pin 54 is engageable with the ball 51 and with a larger cross pin 55 arranged in a transverse opening 56 formed in the plunger 42. The ends of the pin 55 are connected to the sleeve 46 to be moved therewith. The plunger 42 between the opening 56 and the chamber 57 formed by a bore 41 at the adjacent end of the plunger is reduced as at 58 whereby the chamber 57 communicates with the opening 56 and bore 50, and thus with the pressure chamber and the right hand end of the bore when the ball is lifted from its seat. The parts are so designed that as they approach the "off" position the sleeve 43 will engage the plate 45 just before the plunger 42 reaches the "off" position. During the slight additional movement of the plunger 42 to its "off" position the sleeve 46 and pins 55 and 54 and the ball 51 will be held stationary and accordingly the ball 51 will be relatively lifted from its seat for the flow of fluid from the chamber 57 to the pressure chamber.

A valve mechanism illustrated as a whole by the numeral 69 is mounted against the right hand end of the cylinder 38 as viewed in the drawing. This valve mechanism comprises an elongated casing 70 one side 71' of which is flattened to set against the adjacent end of the cylinder 38 and the casing 70 is secured to the cylinder 38 by any suitable means (not shown). The casing 70 is provided with a bore 71 and this bore communicates through a port 72 with a recess 73 formed in the casing 70 in axial alignment with the cylinder 38. An enlarged bore 74 is formed in the adjacent end of the cylinder 38 and forms a shoulder 75 against which seats one end of a spring 76. The other end of this spring engages a combined valve and seat 77 the valve portion of which engages the portion of the face 71' surrounding the recess 73. Obviously the member 77 opens inwardly against the tension of the spring 76. The portion of the member 77 which forms a valve seat is engageable by a valve 78 carrying a stem 77' upon the inner end of which is mounted a spring seat 78'. A spring 79 has one end engaging the seat 78' and its other end engaging the member 77 to urge the valve 78 to closed position. The space within the bore 74 forms a part of the pressure chamber previously referred to and indicated by the numeral 80. Upon an increase in pressure in the chamber 80 the valve 78 opens to permit brake fluid to flow through the port 72 into the interior of the bore 71 as will be described from whence it flows through port 81 through a line 82 having suitable branches connecting it to the forward and rear wheel brake cylinders 83 and 84 respectively.

The valve casing is preferably provided with a liner 85 tightly fitting in an enlarged bore 86 in the valve casing. This liner is provided with annular spaces 86 and 87 communicating respectively with ports 88 and 89, and these ports communicate respectively through pipes 90 and 91 with the ends of the motor 22 as shown in the drawing. The liner 85 is provided with a vacuum port 92 communicating with a port 93 in the valve casing 70, and the passage 93 is in constant communication with the intake manifold of the vehicle engine through a pipe 94.

A valve 95 is slidable in the valve casing and is provided with a pair of lands 96 and 97 forming therebetween a space 97' adapted to be brought into communication either with a plurality of ports 98 communicating with the space 86 or with a plurality of ports 99 communicating with the space 87. According to the position of the valve, therefore, the space 97' may communicate with either end of the cylinder 23 depending upon the position of the valve. In practice, the motor is "vacuum suspended," that is, both ends of the motor 22 communicate with the intake manifold when the motor is deenergized. For this purpose, the adjacent limits of the lands 96 and 97 are spaced apart a distance slightly greater than the distance between the adjacent limits of the ports 98 and 99. Therefore, when the valve 95 is in neutral position both ends of the motor 22 are in limited communication with the intake manifold.

One end of the valve casing 70 is provided with a cap 100 and the space within the adjacent end of the liner 85 forms an air space 101. A passage 102 in the cap 100 affords communication between the space 101 and the atmosphere, preferably through a small air cleaner 103. Movement of the valve 95 upwardly as viewed in the drawing will directly connect the space 101 with the ports 99. In order to connect the ports 98 with the atmosphere, the space 104 within the liner 85 at the end thereof remote from the air space 101 communicates with such space through valve passages 105.

The end of the valve 95 remote from the air space 101 is provided with an axial shank 106 to the end of which is connected a plunger 107. This plunger operates in a portion of the bore 71 which is slightly larger than the portion of the bore in which the valve 95 operates. The plunger 107 is therefore of somewhat greater area than that of the adjacent end of the valve, and the purpose of this will be referred to later. A packing cup 108 is arranged against the plunger 107 and a similar packing cup 108' is arranged against the adjacent end of the valve 95, and these two packing cups are urged away from each other to their properly seated positions by a spring 109. The space between the plunger 107 and valve 95 forms a pressure space 110 which will be referred to later.

The space at the upper end of the bore 71 as viewed in the drawing constitutes a chamber 111 and this chamber communicates with a port 112 to which the pipe 21 is connected. The body of the cylinder and the valve casing 70 are provided with a continuous passage 113 communicating at one end with the chamber 111 and at the opposite end with the chamber 57. The sleeve 46 is cut away as at 114 to afford full communication between the passage 113 and the chamber 57 when the sleeve 46 is seated against the plate 48 as shown in the drawing.

The operation of the apparatus is as follows:

All of the parts of the apparatus are shown in the "off" position in the drawing. When the operator desires to apply the brakes he will depress the pedal 17, thus rocking the bell crank lever 12 and effective movement of the piston 11 toward the left to displace brake fluid from the master cylinder 10 through the pipe line 21. Fluid flows into the chamber 111 to start to generate pressure therein, but the pressure initially built up will be ineffective for moving the plunger 107. As previously stated it is the common practice to normally maintain a substantial pressure in the brake lines leading to the brake cylinders and in the present construction the mechanism comprising the valve elements 77 and 78 will maintain this brake pressure in the brake lines. A corresponding pressure obviously will exist in the chamber 110 and this pressure will act in opposite directions against the valve 95 and plunger 107. The apparatus is so designed that when the brake is off, there will be a net pressure of approximately four pounds acting on the inner face of the plunger 107 tending to move this plunger and associated parts in the direction of the chamber 111.

It will be necessary therefore to generate a pressure above four pounds per square inch in the chamber 111 before the plunger 107 will be moved downwardly as viewed in the drawing. During the building up of this pressure brake fluid will flow from the chamber 111 through passage 113 into the chamber 57. With the parts in the "off" position shown, there will be limited communication between the chamber 57 and the chamber 41 through space 58, opening 56 and bore 50 and thence around the valve 51 and through opening 49. This limited communication is for the purpose of replenishing brake fluid in the chamber 41 when leakage occurs from the brake system during the application of the brakes. This replenishing of leakage takes place as the brake parts are released and the plunger 42 reaches approximately its "off" position, and the limited communication between chambers 57 and 41 has no effect on the operation of the system while the brakes are being applied. As fluid flows through the conduit 21 upon operation of the piston 11, the conduit 113 and chambers 57 and 41 will be filled with the incompressible brake fluid and static pressure will be progressively built up. It requires a pressure of at least seventeen pounds to open the valve 78, whereas it requires a pressure only slightly in excess of the net pressure of four pounds per square inch acting upwardly on the plunger 107 in order to move the plunger downwardly.

It will be apparent, therefore, that the pressure in the chamber 111 will quickly reach a point in excess of four pounds, whereupon downward movement of the plunger 107 and valve 95 will occur. This operation will increase communication between the valve groove 97' and the ports 99 to connect the pipe 91 to the source of partial vacuum. At the same time, the air space 104 will be opened to communication with the ports 98 to connect the pipe 90 to the atmosphere. Thus the piston 28 will start to move to the right and the plunger 42 will be similarly moved. Initial movement of the plunger 42 will take place with the sleeve 46 remaining stationary due to its frictional engagement with the interior of the cylinder 41. Thus the pin 55 will move relatively to the left in its opening 56 to release the pin 54 and permit the check valve 51 to seat. Thus initial motor operation results in closing communication between chambers 41 and 57 and operation of the plunger 42 will quickly increase pressure in the chamber 41 to open the valve 78 and force fluid through chamber 110 into the brake line 82. This action applies the brakes to an extent determined by pressure in the brake line 82. This pressure is determined by pressure in the chamber 41 which, in turn, will depend upon the degree of energization of the motor 22 as determined in accordance with the operation of the valve 95. There will always be a net pressure in the chamber 110 acting upwardly on the plunger 107 and this pressure will vary according to the pressure in the chamber 110 as determined by pressure in the chamber 41, and the latter pressure will be the result of the sum of the forces exerted by the motor 22 and by the foot-generated pressure in the chamber 57. The pressure in the chamber 111 is determined solely in accordance with operation of the treadle 17. Thus it will be apparent that whenever the pressure in the chamber 111 exceeds the net pressure acting upwardly against the plunger 107, this plunger and the valve 95 will be moved downwardly to energize the motor 22. Whenever movement of the treadle 17 in a brake-applying direction is stopped, slight continued operation of the motor will build up pressure in the chamber 110 until the net pressure acting upwardly on this plunger equals the pressure in the chamber 111. Movement of the plunger 107 will be immediately arrested, and a further very slight increase in the chamber 110 while the valve 95 remains in a motor-energizing position will effect the slight upward movement of the plunger 107 necessary to cut off further energization of the motor.

Accordingly it will be apparent that depression of the treadle 17 will effect application of the brakes to an extent corresponding to the extent of movement of the treadle. To hold the brakes in a given position the operator must maintain a pressure in the chamber 111 equal to the net pressure in the chamber 110 acting upwardly on the plunger 107. This provides the treadle 17 with accurate "feel" which is exactly proportional to the degree of brake application. It will be apparent, therefore, that the valve 95 partakes of a follow-up action relative to the movement of the treadle 17. This obviously is true both in the brake-applying and brake-releasing movements of the treadle 17. If the treadle is progressively released a drop in pressure will occur in the chamber 111 whereupon the net pressure in the chamber 110 acting upwardly on the plunger 107 will overbalance the pressure in the chamber 111 to move the plunger 107 and valve 95 upwardly until the net pressure acting upwardly on the plunger 107 equals the pressure acting downwardly on this plunger, or until the brakes are completely released. Upward movement of the valve 95 connects ports 92 to the ports 98, and connects the air space 101 with the ports 99. Thus air will be exhausted from the left end of the motor 22 while air is admitted to the other end thereof. The piston 27 thus will move in a brake-releasing direction and this operation will continue until the brakes have been released to an extent corresponding to an upward movement of the treadle 17.

As the plunger 42 moves toward the left as the treadle 17 moves upwardly, a drop in pressure will occur in the chamber 41 and the higher pressure in the brake line 82 and in the chamber 110 will unseat the valve 77 whereby brake fluid will flow into the chamber 41. This operation will continue until movement of the plunger 42 is arrested and the valve 77 will immediately close. It requires approximately seventeen pounds per square inch of pressure to open the valve 77 and when the brakes are completely released such pressure will be maintained in the brake line 82 and in the brake cylinders 83 and 84. As is customary, the return springs of the brake cylinders will overcome a pressure of approximately seventeen pounds per square inch, and accordingly the brakes will be completely released when this pressure exists. Normal pressure is retained in the brake lines to prevent the occurrence of air pockets in the brake fluid, as is well known.

The chamber 57 obviously increases in capacity as the plunger 42 moves to the right to apply the brakes. This increase in capacity of the chamber 57 accommodates the fluid displaced from the master cylinder 10. Moreover, the pressure in the chamber 111 obviously will be always duplicated in the chamber 57 and accordingly the operator performs part of the work in applying the brakes. When the brake is released and the parts move to their "off" positions, the sleeve 46 obviously will contact the plate 45 just before the plunger 42 reaches its "off" position. In other words, the plunger has its "off" position determined by contact of the stem 34 with the lug 37 and just before this point of contact is reached, the sleeve 46 will contact the plate 45 and the plate 45 remains stationary as the plunger 42 partakes of its last increment of movement. During such movement, the sleeve 46 and pins 55 and 54 will move relative to the plunger 42 to unseat the valve 51. If any leakage from the brake system has occurred during the preceding brake operation, the opening of the valve 51 will permit fluid to flow from the chamber 57 to the chamber 41 in an amount equal to the fluid which has leaked from the system.

The present apparatus is highly advantageous for several reasons. In normal brake constructions the brake pedal projects a substantial distance above the toe board of the vehicle and this is necessary to provide the leverage required for brake operation. This places the normal position of the pedal substantially higher than the accelerator pedal. It is desirable to substantially lower the brake pedal so as to facilitate movement of the operator's foot from the accelerator pedal to the brake pedal. However, this is impracticable with conventional master cylinders because of the use of the automatic inlet and outlet valves employed at the outlet ends of the master cylinders. As previously stated these valves are employed to maintain substantial normal pressures in the brake lines. While it is practicable to lower the brake pedal in a power brake system, it is impracticable to do this where conventional master cylinders are employed since the operator is forced to effect substantial pressures to open the master cylinder outlet valve with the substantially decreased leverage afforded by a lowered brake pedal having a shortened path of travel.

One of the distinct advantages of the present construction lies in the fact that it provides means for maintaining the desired normal pressures in the brake lines without calling upon the operator to create the force necessary to open the outlet valve. In the present construction the automatic inlet and outlet valves are associated with the outlet end of the pressure chamber 41, the master cylinder 10 being in open communication with the pipe line 21 at all times. To initiate operation of the brakes, the operator is called upon to create a pressure which is merely in excess of the net pressure acting upwardly on the plunger 107. In a typical installation of the mechanism this net pressure is four pounds, and accordingly a very "light" brake pedal is provided.

Moreover, it will be noted that the valve mechanism is wholly external of the motor and accordingly is easily installed and readily accessible for servicing. In addition, the valve mechanism is of such type that it can be more cheaply manufactured than valve mechanisms wherein the plunger of the brake motor is bored to receive a valve element. The brake mechanism is highly sensitive and extremely accurate in its response to operation of the treadle 17.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A brake operating mechanism for a hydraulic vehicle brake system having hydraulic brake cylinders for the vehicle wheels, comprising a master cylinder having a pedal-controlled piston therein, a conduit having one end in communication with the master cylinder, a power operated mechanism comprising a motor and a cylinder, a plunger connected to the motor and reciprocable in the last named cylinder, one end of said last named cylinder constituting a pressure chamber, a control valve mechanism for said motor carried by said second named cylinder and comprising a valve housing, a valve therein movable to control energization of said motor, a pair of plungers of different areas connected to each other and to said valve and operable in said valve housing, the space between said pair of plungers forming a passage communicating between said pressure chamber and with the wheel cylinders, one end of said valve housing being connected to the other end of said conduit whereby the adjacent plunger of said pair will be subjected to master cylinder pressures, the pressures in the space between the plungers of said pair acting oppositely thereagainst whereby the net effective pressure opposes the master cylinder pressure.

2. A brake operating mechanism constructed in accordance with claim 1 wherein the other end of the cylinder of said power operated mechanism constitutes a receiving chamber communicating with the master cylinder.

3. A brake operating mechanism constructed in accordance with claim 1 wherein the other end of the cylinder of said power operated mechanism constitutes a receiving chamber communicating with the master cylinder, and means for affording restricted communication between said chambers when the plunger of said power operated mechanism is in its "off" position.

4. A brake operating mechanism constructed in accordance with claim 1 wherein said conduit has unrestricted communication with the master cylinder, and an automatic valve device controlling communication between said pressure chamber and the space between the plungers of said pair to maintain approximately a predetermined minimum pressure in the wheel cylinders.

5. A brake operating mechanism constructed in accordance with claim 1 wherein said conduit has unrestricted communication with the master cylinder, and an automatic valve device controlling communication between said pressure chamber and the space between the plungers of said pair to maintain approximately a predetermined minimum pressure in the wheel cylinders, said automatic valve device comprising a pair of valve elements each having a seat, and spring means biasing said valve elements to closed position against the respective pressures in said pressure chamber and in the space between the plungers of said pair.

6. A brake operating mechanism for a hydraulic vehicle brake system having hydraulic brake cylinders for the vehicle wheels, comprising a master cylinder having a pedal controlled piston therein, a conduit having one end in unrestricted communication with the master cylinder, a pressure generating cylinder having an opening therethrough from end to end, a plunger reciprocable in said pressure generating cylinder, one end of such cylinder being a pressure chamber and the other end being a receiving chamber, a motor fixed to the last named end of said pressure generating cylinder and having a power operated rod projecting into said control chamber to effect actuation of said plunger upon operation of said motor, a control device comprising a casing secured against the pressure chamber end of said pressure generating cylinder and having a port communicating therewith, a pair of plungers of different diameters connected to each other and reciprocable in said casing, said port communicating with said casing between the plungers of said pair, and a control device for said motor connected to said pair of plungers, a fluid line connected to the brake cylinders and communicating with said casing between the plungers of said pair, said casing having a fluid chamber with which said conduit communicates to effect pressure against the larger plunger of said pair upon actuation of the pedal-controlled piston, a conduit communicating between such chamber and said receiving chamber, and an automatic valve device controlling communication between said pressure chamber and the space between the plungers of said pair to maintain approximately a predetermined minimum pressure in the wheel cylinders.

JEANNOT G. INGRES.

REFERENCES CITED

The following references are of record in the file of this patent:

UNITED STATES PATENTS

| Number | Name | Date |
|---|---|---|
| 1,962,857 | Cash | June 12, 1934 |
| 2,074,730 | Kerr | Mar. 23, 1937 |
| 2,191,318 | Hoyt | Feb. 20, 1940 |
| 2,236,415 | Russell | Mar. 25, 1941 |
| 2,252,482 | Gates | Aug. 12, 1941 |
| 2,260,490 | Stelzer | Oct. 28, 1941 |
| 2,306,346 | Rockwell | Dec. 22, 1942 |
| 2,318,756 | Choulings | May 11, 1943 |
| 2,332,340 | Price | Oct. 19, 1943 |
| 2,353,755 | Price | July 18, 1944 |

FOREIGN PATENTS

| Number | Country | Date |
|---|---|---|
| 514,917 | Great Britain | Nov. 21, 1939 |